F. MAIER.
PROCESS FOR RETREADING TIRES.
APPLICATION FILED MAY 14, 1919.

1,336,911. Patented Apr. 13, 1920.

Witness:
R. Burkhardt

Inventor:
Fred Maier,
By Wilkinson & Huxley
attys.

UNITED STATES PATENT OFFICE.

FRED MAIER, OF LOS ANGELES, CALIFORNIA, ASSIGNOR TO WESTERN VULCANIZER MANUFACTURING COMPANY, OF CHICAGO, ILLINOIS, A COPARTNERSHIP CONSISTING OF HERBERT K. WHEELOCK, FRANK A. WELLER, AND WALTER R. FONTAINE.

PROCESS FOR RETREADING TIRES.

1,336,911.   Specification of Letters Patent.   Patented Apr. 13, 1920.

Application filed May 14, 1919. Serial No. 296,986.

*To all whom it may concern:*

Be it known that I, FRED MAIER, a citizen of the United States, residing at Los Angeles, in the county of Los Angeles and State of California, have invented certain new and useful Improvements in Processes for Retreading Tires, of which the following is a specification.

My invention relates to improvements in processes for retreading tires, and refers particularly to a process by which overvulcanization of a portion of the tire is prevented.

In retreading tires it is customary to employ a retreader having an arcuate vulcanizing bed extending through slightly more than 120 degrees of a circle. The tire to be retreaded is placed in this vulcanizing bed and vulcanized by means of steam or otherwise, after which a second section of the tire is moved into position and vulcanized, and finally the third section is similarly moved into position and vulcanized.

It will be evident that inasmuch as the vulcanizing bed covers an arc of more than 120 degrees, when the third section of the tire is brought into position, there will be a portion of the first section which has already been vulcanized which is again brought into engagement with the vulcanizing bed. This results in overvulcanization of that portion of the first section of the tire which has already been subjected to the vulcanizing operation.

It is the object of my invention to overcome the difficulty just mentioned, and I accomplish this by the use of a suitable heat insulator which protects the tire from overvulcanization of that portion of its periphery which has already been previously vulcanized; and in the case of a tire having anti-skid configurations thereon, prevents any tendency to disfigure the configurations in the previously vulcanized portion of the tire by improper matching of these configurations with those of the vulcanizing bed.

My invention is also applicable to retreading tires in which an old tire is repaired by renewing only a portion of the tread, by putting in a new section which is vulcanized, while the rest of the tire is protected from overvulcanization.

These and other objects of my invention will be more readily understood by reference to the accompanying drawings, in which—

In the process of retreading a tire 10, this tire is suitably clamped in the vulcanizing bed 11 of a retreader, this insulating bed being arcuate in form and extending through an arc of slightly more than 120 degrees, as previously explained. If it is desired to retread a tire with anti-skid configurations on the tread, the vulvanizing bed 11 is provided with a suitable design thereon, preferably carried by a removable matrix, so that the corresponding configuration is given to the tread of the tire.

The heat for the vulcanizing operation may be supplied by means of steam which is brought into contact with the wall of the vulcanizing bed 11.

After the first section of the periphery of the tire 10 has been vulcanized, the tire is then moved around in the vulcanizing bed so that a second section is brought into contact with the vulcanizing bed.

Figure 1:
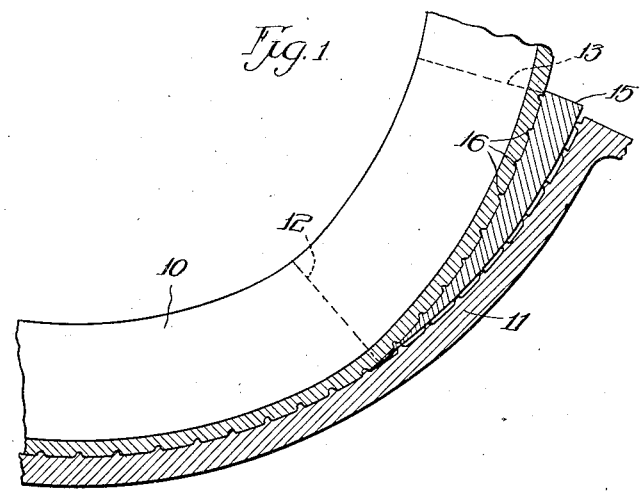
Figure 1 is a vertical longitudinal section through a portion of a retreader, showing a portion of a tire and the insulating means in position.
Figure 2:
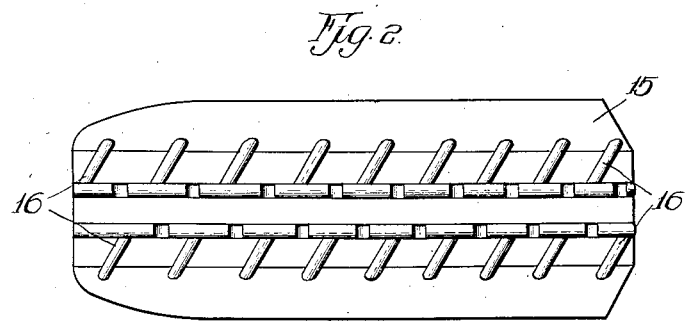
Fig. 2 is a plan of the insulating member.
Figure 3:
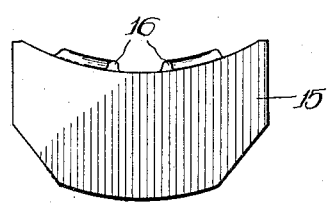
Fig. 3 is an end elevation of the insulating member.

After this second operation is completed, the tire is moved to bring a third section of the periphery into contact with the vulcanizing bed; and by so doing, a portion of the first section already vulcanized, and which in Fig. 1 is represented as extending to the dotted line 12, would again be brought into engagement with the vulcanizing bed, thus causing an overvulcanization of that portion of the tire represented between the dotted line 13 opposite the end of the vulcanizing bed 11 and the dotted line 12.

In order to avoid the overvulcanization just mentioned, whenever there is a portion of the tread which has already been vulcanized and is again brought into engagement with the vulcanizing bed, as, for example, that portion of the tire between the dotted lines 12 and 13 as shown in Fig. 1, I insert between the vulcanizing bed 11 and the tire, a wedge-shaped insulator 15 made of wood, fiber, or other suitable heat insulating material.

If the tire which is being retreaded is to be provided with anti-skid configurations, the insulator 15 may be provided with suitable reversed configurations 16 on one face, either to fit the configurations contained in the vulcanizing bed 11 or to fit the configurations of the tread of the tire 10. In the drawings I have shown the configurations 16 on the insulator 15 as adapted to fit the corresponding configurations on the tire 10. If preferred, however, the insulator 15 may be made with plain surfaces on both of its faces, and, of course, this should be done in any event when a plain tread is used on the tire.

By inserting the insulator 15 between the vulcanizing bed 11 and that portion of the tire which has already been vulcanized, overvulcanization is thereby effectively prevented.

In bringing the vulcanized portion of the tire, as, for example, the portion contained between dotted lines 12 and 13, into engagement with the vulcanizing bed 11, when the latter contains configurations, these often will not match with the configurations of the vulcanized portion of the tire. Disfigurement of the tire is thus prevented by the insulator 15, which, being plain on one face, adjusts itself quickly and easily in the desired position.

It will be apparent to those skilled in the art that many changes could be made in the details of the process which I have described without departing from the spirit and scope of the invention.

What I claim is:

1. The process of retreading tires, which consists in first subjecting a section of the periphery of a tire to the action of vulcanizing means, then moving said tire to present another section thereof to the action of said vulcanizing means, and inserting an insulator between said vulcanizing means and that portion of the first section of the tire which has already been vulcanized, whereby overvulcanization of said portion is prevented.

2. The process of retreading tires, which consists in first vulcanizing a section of the periphery of the tire in an arcuate vulcanizing bed, then moving said tire within said bed to present another section of said periphery to the vulcanizing action of said bed, and inserting an insulator between said bed and the tire over that portion of the bed and the tire over that portion of the first section of the tire which has already been vulcanized, whereby overvulcanization of said portion is prevented.

3. The process of retreading tires having configurations thereon, which consists in first vulcanizing a section of the periphery of said tire in an arcuate vulcanizing bed containing configurations, then moving said tire so that another section of the periphery of the latter is brought into engagemnt with said vulcanizing bed, and inserting between said vulcanizing bed and that portion of the tire which has already been vulcanized an insulator having corresponding configurations on one face thereof, whereby overvulcanization and disfigurement of the configurations of said vulcanized portion of the tire are prevented.

4. The process of retreading tires having configurations thereon, which consists in first vulcanizing a section of the periphery of said tire in an arcuate vulcanizing bed containing configurations, then moving said tire so that another section of the periphery of the latter is brought into engagement with said vulcanizing bed, and inserting between said vulcanizing bed and that portion of the tire which has already been vulcanized an insulator having on one face thereof configurations conforming to the configurations on said tire, whereby overvulcanization and disfigurement of the configurations of said vulcanized portion of the tire are prevented.

5. The process of treating tires, which consists in placing the tire having an unvulcanized portion thereon in a vulcanizing bed which would normally engage a vulcanized portion of said tire, inserting a heat insulator between the vulcanizing bed and the previously vulcanized portion of the tire, and applying heat to said vulcanizing bed, whereby the unvulcanized portion of the tire will be vulcanized and the previously vulcanized portion of the tire will be protected from overvulcanization.

Signed at Chicago, Illinois, this 5th day of May, 1919.

FRED MAIER.